United States Patent [19]

Haag

[11] Patent Number: 4,533,374

[45] Date of Patent: Aug. 6, 1985

[54] METHOD FOR REDUCING AIR POLLUTION

[75] Inventor: James W. Haag, Marrero, La.

[73] Assignee: Texaco Inc., White Plains, N.Y.

[21] Appl. No.: 540,478

[22] Filed: Oct. 11, 1983

[51] Int. Cl.³ ............................................... F25J 3/04
[52] U.S. Cl. .......................................... 62/18; 62/24; 62/41
[58] Field of Search ..................... 62/38, 39, 9, 11, 23, 62/24, 27–32, 34, 18, 41

[56] References Cited

U.S. PATENT DOCUMENTS 2,520,862  8/1950  Swearingen ........................... 62/38

Primary Examiner—Frank Sever
Attorney, Agent, or Firm—Robert A. Kulason; Henry C. Dearborn

[57] ABSTRACT

Method for reducing air pollution in connection with a cryogenic facility to produce nitrogen which facility uses natural gas as fuel for the engines that drive the compressors. Oxygen is a by-product of the cryogenic facility and is usually vented. The by-product oxygen is captured and mixed with the fuel for the engines in order to reduce the amount of pollution from the engines exhaust.

6 Claims, 2 Drawing Figures

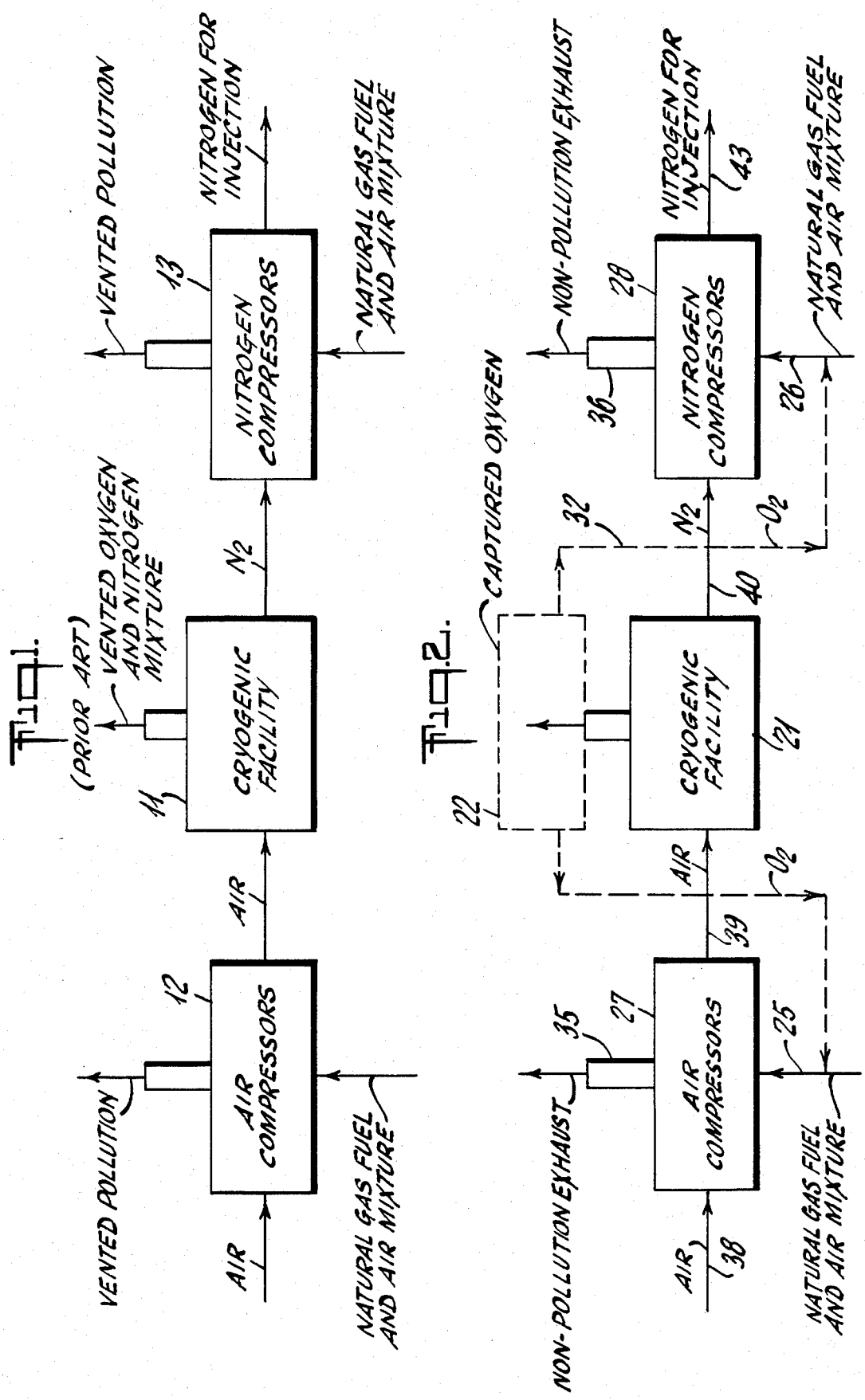

METHOD FOR REDUCING AIR POLLUTION

FIELD OF THE INVENTION

This invention concerns reduction of air pollution, in general. More specifically, it relates to a method for reducing air pollution in connection with generating nitrogen by cryogenic air separation. The nitrogen is for use in enhanced oil recovery and the like. In such a cryogenic operation, if the engines employed to drive the compressors make use of natural gas for fuel, the engines exhaust have high quantities of air pollutants.

BRIEF SUMMARY OF THE INVENTION

Briefly, the invention is in connection with a cryogenic facility producing nitrogen for use in enhanced oil recovery and the like and having oxygen as a by-product. The said facility employs internal combustion engines for driving air and nitrogen compressors. The said engines use natural gas and air mixture for fuel. The invention concerns a method for reducing air pollution caused by the effluent from said facility. It comprises the capturing of said by-product oxygen, and the feeding of said captured oxygen into said fuel to reduce the $NO_x$ compound content of the exhaust from said internal combustion engines.

Again briefly, the invention relates to a cryogenic facility that produces nitrogen for enhanced oil recovery or the like. The said facility employs internal combustion engines, and said engines employ natural gas-air mixture for fuel. The engines create unacceptable levels of nitrogen oxides at the exhaust, and a method of reducing said levels of nitrogen oxides comprises the step of using by-product oxygen from said facility to enrich said internal combustion engines fuel whereby said levels of nitrogen oxides are reduced to an acceptable quantity.

BRIEF DESCRIPTION OF THE DRAWINGS

The foregoing and other objects and benefits of the invention will be more fully set forth below in connection with the best mode contemplated by the inventor of carrying out the invention, and in connection with which there are illustration provided in the drawings, wherein:

FIG. 1 is a schematic block diagram illustrating the prior art; and

FIG. 2 is a similar schematic block diagram including the invention.

DETAILED DESCRIPTION OF THE INVENTION

In enhanced oil recovery operations, the use of nitrogen as an injectant is often employed. In such case, the quantity of nitrogen required is large so that cryogenic air separation is an accepted form of technology to provide nitrogen in the quantities needed. However, it is economically attractive to fuel the cryogenic facility with its associated compression equipment, by burning natural gas which is readily available in the oil field. But, the natural gas in combination with air that is used in the combustion process yields toxic nitrogen oxides. These are classified as pollutants by the Environmental Protection Agency, and the EPA has emission restrictions which make it very difficult or impossible to obtain approval to install and operate the required facilities.

It may be noted that basically, all of the nitrogen contained in the aforementioned $NO_x$ emissions comes from the air supporting the combustion involved in the operation of the compressor engines which are being fueled by a mixture of natural gas and air. Thus, a simplified equation which illustrates the conditions may be expressed as follows:

$$\text{Air}(N,O) + \text{fuel}(H,C) = \text{Energy} + NO_x \text{ pollutants} \quad (1)$$

It will be noted that elimination of the nitrogen component in the foregoing expression will eliminate the pollution. And, if only oxygen were added to the fuel that would be accomplished. However, it is also a fact that if there is only oxygen fed to the fuel mixture the engines would run too hot because of excessive combustion temperatures. Consequently, a feature of this invention is to make use of some of the oxygen from the cryogenic air separation to enrich the fuel mixture so that the requirement of reduction of pollutants may be met. It will be understood that the most feasible manner of determining how much oxygen to add is by making adjustment of the amount of oxygen added to the fuel mixture so as to minimize pollutants while not overheating the engines.

In order to take advantage of the availability of natural gas at the location where nitrogen is being generated for injection in one or more oil wells, the fuel for compressor engines used in the cryogenic facility is natural gas-air mixture. But, it is this fuel that creates unacceptable amount of $NO_x$ pollutants in the exhausts. However, if oxygen enriched air is used in the fuel mixture, the amount of $NO_x$ pollutants can be substantially reduced. So, by obtaining the oxygen employed in making the enrichment of the fuel mixture for the compressor engines as a by-product from the cryogenic facility, a means of pollutant control with economic benefit is obtained, since the oxygen would otherwise be vented to the atmosphere. An empirical determination of the optimum mixture of oxygen with the air of the fuel mixture to the engines may be made by experimentation for each engine under consideration. It may be noted that an optimum blend of oxygen and air would result in two improvements, i.e. (1) the reduction or elimination of $NO_x$ pollutants, and (2) the increased combustion efficiency with associated decrease in fuel consumption at the engines.

The drawings illustrate the prior art in FIG. 1. A cryogenic facility 11 is a type such as the unit described in Kirk-Othmer's "Encyclopedia of Chemical Technology", Third Edition, Volume 15. At page 935 there is a description of "Cryogenic Air Separation" which continues on page 936. Prior to this invention, if the cryogenic facility 11 was operated near a source of natural gas, that natural gas would be employed as the fuel for both air compressors 12 and nitrogen compressors 13. And, since the facility 11 would be operated only to generate a source of nitrogen for use in injection procedures for secondary recovery in oil wells, the oxygen which would be generated by the facility 11 as a by-product would be merely vented.

Because the compressor engines (not shown) which drive the air compressors 12 and the nitrogen compressors 13 need a mixture of air with the natural gas so as to provide a combustible mixture for the internal combustion engines, they would produce in the exhausts a quantity of pollutants in the form of $NO_x$ compounds which would be unacceptable so that clearance for building and operating such a unit could be unobtainable.

However, by applying this invention in accordance with the FIG. 2 diagram in the drawings, the pollution may be substantially reduced. Thus, the invention may be applied to a cryogenic facility 21 which is operated so as to capture oxygen developed as a by-product. This is indicated by a dashed line block 22 having the caption "CAPTURED OXYGEN" applied thereto. The captured oxygen is directed to fuel input lines 25 and 26 of air compressors 27 and nitrogen compressors 28, respectively. Such directed oxygen flows over paths 31 and 32 which are indicated by dashed lines in the FIG. 2 illustration. It will be understood that the amount of oxygen which is added to the fuel mixture inputs 25 and 26 is adjusted in each case so as to provide optimum conditions as described above. Therefore, the amount of exhaust pollution from schematically indicated stacks 35 and 36 from the air compressors 27 and the nitrogen compressors 28 respectively, is reduced to an optimum minimum while permitting the compressor engines to run more efficiently but without overheating.

It will be understood that the cryogenic facility 21 includes an air intake as indicated by an arrow 38 to the compressors 27. Then compressed air goes via an intake line 39 applied to the facility 21 where separation is carried out by distillation or by molecular sieve action and the nitrogen that is separated goes (as indicated) by an output line 40 that carries the caption $N_2$. The nitrogen then goes to the nitrogen compressors 28 and the compressed nitrogen goes for injection as indicated by an ouput arrow 43.

A typical cryogenic facility for generating nitrogen to use in an oil field operation might run with an input of 45 million cubic feet per day, e.g. at air input (arrow 38), and an output of 25 million cubic feet per day of nitrogen, e.g. at nitrogen output (arrow 43). In such case there would be 20 million cubic feet per day of oxygen and nitrogen mixture without the capture of any of the oxygen.

While a particular embodiment of the invention has been described in considerable detail in accordance with the applicable statutes, this is not to be taken as in any way limiting the invention but merely as being descriptive thereof.

I claim:

1. In a cryogenic facility located in a remote oil field and producing a large quantity of nitrogen for use in enhanced oil recovery and the like, said facility producing oxygen as a by-product, said facility employing a plurality of internal combustion engines at least one each for driving air and nitrogen compressors, said engines employing natural gas readily available in said remote oil field with air mixture for fuel whereby unacceptable levels of $NO_x$ pollutants are generated by the exhausts from said engines, a method for reducing said air pollution by said engine exhausts at said facility, comprising:

capturing said by-product oxygen, and
   feeding said captured oxygen into said fuel to reduce the $NO_x$ compound content of the exhaust from said interal combustion engines.

2. The method according to claim 1, wherein
   said step of feeding captured oxygen, comprises regulating the volume of oxygen included in said fuel to minimize the $NO_x$ compound content of said exhaust without overheating said internal combustion engines.

3. In a cryogenic facility producing a large quantity of nitrogen for use in enhanced oil recovery and producing oxygen as a by-product, said facility being located in a remote oil field with natural gas readily available, said facility employing a plurality of internal combustion engines, said engines using said natural gas with air mixture for fuel, and said engines creating unacceptable levels of nitrogen oxides at the exhausts thereof, a method for reducing said levels of nitrogen oxides to acceptable levels, comprising:

using said by-product oxygen from said facility to enrich said internal combustion engines fuel sufficiently to reduce said levels of nitrogen oxides to an acceptable quantity.

4. In a cryogenic facility according to claim 3, wherein:
   said internal combustion engines drive compressors for input air to said facility and for output nitrogen from said facility.

5. In a cryogenic facility according to claim 4, wherein:
   said fuel enrichment is adjusted for optimum oxygen-air mixture to reduce levels of nitrogen oxides at the exhausts without overheating said engines.

6. In a cryogenic facility according to claim 3, wherein:
   said fuel enrichment is adjusted for optimum oxygen-air mixture to reduce levels of nitrogen oxides at the exhausts without overheating said engines.

* * * * *